Patented Apr. 2, 1929.

1,707,918

UNITED STATES PATENT OFFICE.

BERTRAM MAYER, OF BASEL, AND JAKOB WÜRGLER, OF NEUEWELT, NEAR BASEL, SWITZERLAND, ASSIGNORS TO SOCIETY OF CHEMICAL INDUSTRY IN BASLE, OF BASEL, SWITZERLAND, A FIRM.

INDIGOID DYESTUFFS AND PROCESS OF MAKING SAME.

No Drawing. Application filed March 6, 1926, Serial No. 92,936, and in Switzerland March 18, 1925.

The present invention relates to new indigoid dyestuffs valuable for the production of fast tints on the fibre; it comprises the new dyestuffs, the process of making same and the material dyed with the new products.

The new dyestuffs correspond with the general formula

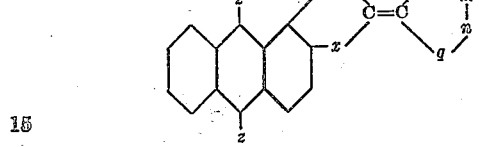

wherein one of the two $x$'s stands for a sulfur atom and the other for a CO group, $z$ for a hydrogen or an oxygen atom and $m$, $n$ and $q$ for three members of a 5 membered nucleus of which two at least are carbon atoms adjacent to each other and belonging to any aromatic system, and the third being S, NH or C.

The new products are obtained from the halogenanthraquinonecarboxylic acids corresponding with the general formula

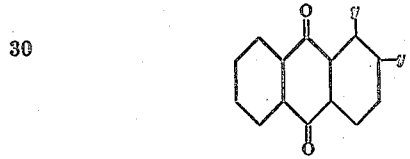

wherein one of the two $y$'s signifies a halogen atom and the other a carboxylic group.

By action of an alkali metal sulfhydrate on these halogenoanthraquinone carboxylic acids, there are obtained mercapto carboxylic acids corresponding with the general formula

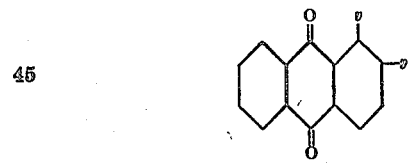

wherein one of the two $v$'s means a SH group and the other a carboxylic group.

By treatment with reducing agents, these new anthraquinone mercapto carboxylic acids are converted into anthracene mercapto carboxylic acids corresponding with the general formula

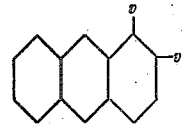

wherein the two $v$'s have the signification indicated above. These anthracene mercapto carboxylic acids are converted by condensation with monohalogenoacetic acids as for instance monochloro acetic acid into thioglycoliccarboxylic acids corresponding with the general formula:

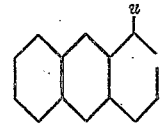

wherein one of the two $u$'s stands for a COOH group and the other for the group —S.CH$_2$.COOH. The thioglycoliccarboxylic acids are converted finally by treatment with condensing agents having an acid action, such as acetic acid anhydride into anthracene oxythiophene compounds of the general formula

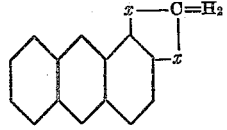

wherein one of the two $x$'s stands for a sulfur atom and the other for a CO group.

The anthracene-2-thioglycolic-1-carboxylic acid may also be obtained by reduction of the anthraquinone-2-thioglycolic-1-carboxylic acid which latter may be prepared either by condensation of a 2-halogenoanthraquinone-1-carboxylic acid with thioglycolic acid, or by condensing anthraquinone-2-mercapto-1-carboxylic acid with a monohalogenoacetic acid. The anthraquinone-2-thioglycolic-1-carboxylic acid may also, by treatment with condensing agents, be converted into a 2:1-anthraquinone oxythiophene compound of the formula

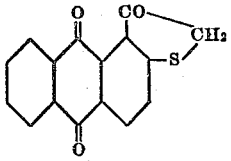

The anthracene and anthraquinone oxythiophene compounds mentioned above may, by condensation with nitrosated aromatic derivatives, such as the p-nitrosodimethylaniline, be converted into anils of the corresponding heterocylic diketones (anils of the 2:1-anthraquinone- and anthracene-thioisatins, of the 1:2-anthracene-thioisatin). The thioisatins themselves such as the 2:1-anthracenethioisatin may be obtained by condensation of anthracenemercaptans with oxalyl chloride.

The 2-halogenoanthraquinone-1-carboxylic acids may also be condensed with glycocol. There is thus obtained the anthraquinone-2-glycine-1-carboxylic acid which, by means of condensing agents, may be converted correspondingly into a derivative of the 2:1-anthraquinone indoxyl.

The new oxythiophene compounds mentioned above and deriving from the general formula:

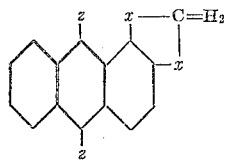

wherein one of the two $x$'s stands for a sulfur atom and the other for a CO group, $z$ meaning a hydrogen or an oxygen atom, yield, either by oxidation, or by condensation with aromatic polycyclic products adapted to react like o-diketones as for example isatins, thionaphthenequinones, acenaphthenequinones, naphthoquinones, the arylides or halides of these products, dyestuffs corresponding with the general formula:

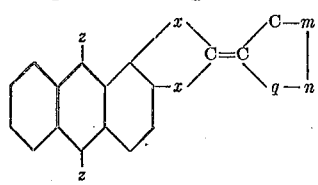

explained above.

These new dyestuffs form powders with yellowish-green to grey, brown, violet and black coloration, dissolving in concentrated sulfuric acid with yellowish-green to green, blue and violet more or less bright or blackish coloration, in dilute caustic soda solution on addition of hydrosulfite with yellowish-brown or olive to more or less bluish-red and grey coloration, dyeing cotton green to brown, Bordeaux violet and grey tints. These dyestuffs are also obtained, owing to the intermedial formation of the corresponding oxythiophenes, from the thioglycoliccarboxylic acids mentioned above.

Dyestuffs corresponding with the above indicated general formula which are similar to or identical with those of which the properties have just been enumerated are also obtained by condensing the 2:1- or 1:2-anthracene- or anthraquinone-thioisatin anils or the corresponding thioisatins with substances reacting as if containing an active methylene group such as indoxyls, oxythiophenes, naphthols etc.

These dyestuffs are converted into halogenized dyestuffs by treatment with halogenizing agents.

In the following examples the centigrade temperature scale has been used throughout.

*Example 1.*

30 parts of 1-chloroanthraquinone-2-carboxylic acid are dissolved in a solution of 18 parts of sodium sulfhydrate in 300 parts of water and boiled for some time. Acid is added to the violet-red solution and the precipitate thus obtained is filtered and purified by dissolving it in an alkali (in presence of some hydrosulfite) and reprecipitation with an acid. The 1-mercaptoanthraquinone-2-carboxylic acid thus obtained corresponding with the general formula

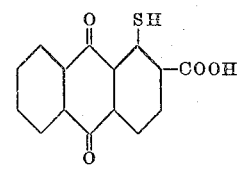

forms a brown-red powder, dissolving in an aqueous soda solution with violet-red coloration in an alkaline hydrosulfite solution or in concentrated sulfuric acid with red-orange coloration.

If the 1-chloroanthraquinone-2-carboxylic acid is replaced by the 2-bromoanthraquinone-1-carboxylic acid, the 2-mercaptoanthraquinone-1-carboxylic acid is obtained; yellow powder showing the same properties as the isomeric compound.

*Example 2.*

25 parts of 2-mercaptoanthraquinone-1-carboxylic acid are introduced into a mixture of 250 parts of water, 120 parts of ammonia of 24% strength and 60 parts of zinc powder, the whole being heated for about 2 hours while stirring well. The mixture is then filtered and the filtrate acidified while hot after addition of some hydrosulfite, the yellow precipitate formed is filtered and dried. There is thus obtained the 2-mercaptoanthracene-1-carboxylic acid corresponding with the formula

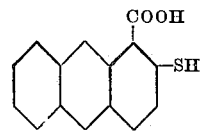

forming a yellow powder, dissolving in sodium carbonate solution with yellow, in concentrated sulfuric acid with olive coloration.

The 1-mercaptoanthracene-2-carboxylic acid of the formula

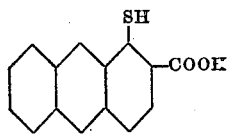

obtained in quite the same manner from 1-mercaptoanthraquinone-2-carboxylic acid forms a yellow powder dissolving in sodium carbonate solution with yellow, in concentrated sulfuric acid with olive-green coloration.

*Example 3.*

12 parts of 1-mercaptoanthracene-2-carboxylic acid are treated with a mixture from 70 parts of alcohol, 5 parts of monochloroacetic acid and 8 parts of potash. The mixture is stirred for some time and concentrated hydrochloric acid is then added until acid reaction, the inorganic salts and by-products formed are filtered, the alcohol is distilled in a vacuum, the residue extracted with soda solution and the extracted product treated with an excess of acid. The anthracene-1-thioglycolic-2-carboxylic acid thus precipitated and corresponding with the formula

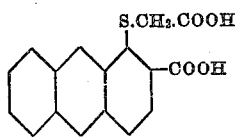

is filtered and dried. It forms a light yellow powder dissolving in soda solution with brown-yellow, in concentrated sulfuric acid with bluish-red coloration changing rapidly to brown. The anthracene-2-thioglycolic-1-carboxylic acid which may be prepared in the same manner shows the same reactions.

*Example 4.*

8 parts of anthracene-2-thioglycolic-1-carboxylic acid are heated slowly with a mixture of 40 parts of acetic acid anhydride and 2 parts of anhydrous sodium acetate until evolution of carbon dioxide is achieved. By cooling there crystallizes an acetylated derivative which is filtered and saponified by treatment with an alcoholic solution of caustic soda. The saponification liquid is filtered and acid is added; the 2:1-anthracene-oxythiophene, corresponding with the formula:

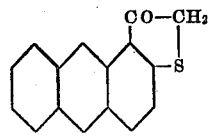

which separates is filtered and dried. It forms a yellow powder, dissolving in an alcoholic caustic soda solution with yellow, in concentrated sulfuric acid with scarlet coloration changing rapidly to brown.

The 1:2-anthracene-oxythiophene of the formula

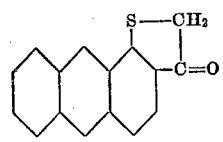

shows very analogous properties; it dissolves in concentrated sulfuric acid first with bluish-red coloration, crystallized from alcohol it forms olive-yellow crystals melting at 200°.

*Example 5.*

33 parts of 2-bromoanthraquinone-1-carboxylic acid are heated for several hours in an autoclave at 130–140° in presence of 400 parts of water, 4 parts of caustic soda and 11 parts of thioglycolic acid. The content of the autoclave is filtered, the residue exhausted with a dilute soda solution and the product of the extraction treated with acid. The anthraquinone-2-thioglycolic-1-carboxylic acid precipitates in form of yellow flakes which are filtered and dried. The anthraquinone-2-thioglycolic-1-carboxylic acid of the formula

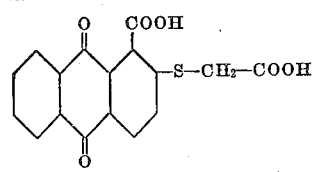

forms a yellow powder, dissolving in caustic soda solution with yellow coloration changing to orange by addition of hydrosulfite. It dissolves in concentrated sulfuric acid with scarlet coloration which solution eliminates yellow flakes on addition of water.

The same anthraquinone-2-thioglycolic-1-carboxylic acid may be also obtained by heating for a short time 12 parts of 2-mercaptoanthraquinone-1-carboxylic acid with a mixture of 70 parts of alcohol, 5 parts of monochloroacetic acid and 9 parts of potash, proceeding as indicated in Example 3.

The anthraquinone-2-thioglycolic-1-carboxylic acid reduced as described in Example 2, yields the anthracene-2-thioglycolic-1-carboxylic acid of Example 3.

*Example 6.*

10 parts of anthraquinone-2-thioglycolic-1-carboxylic acid are heated with caution with 50 parts of acetic acid anhydride and 2 parts of anhydrous sodium acetate until evolution of carbon dioxide is completed; the mixture is then heated to boiling. By cooling there crystallizes in form of brown-violet crystals an acetylated derivative of the 2:1-anthraquinone-oxythiophene which is filtered and dried. The new product is insoluble in cold caustic alkali solutions but it dissolves in cold concentrated sulfuric acid with brown-yellow and in hot sulfuric acid with green coloration.

By saponification with alcoholic caustic soda solution there is obtained the 2:1-anthraquinone-oxythiophene of the formula

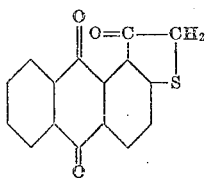

a grey-violet powder, soluble with difficulty in caustic alkali solutions, soluble in the latter on addition of hydrosulfite with yellow-orange coloration, soluble in boiling alcohol on addition of caustic alkalis with olive coloration, in pyridine with brown-violet and in concentrated sulfuric acid with yellow-brown coloration.

*Example 7.*

75 parts of 2:1-anthraquinone oxythiophene are introduced into a mixture of 1500 parts of alcohol and 35 parts of caustic soda solution of 30% strength, the whole is then heated at 40° and treated with 48 parts of p-nitrosodimethylaniline dissolved in 300 parts of alcohol. The mixture is stirred for some time and the p-dimethylaminoanil of 2:1-anthraquinonethioisatin of the formula

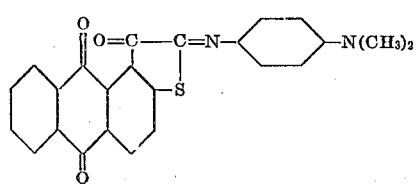

which separates as blackish-violet powder is filtered. The 2:1-anthraquinone-thioisatin of the formula

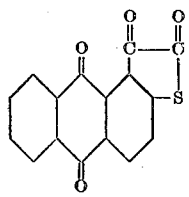

dissolves in concentrated sulfuric acid with yellowish-brown, in pyridine with violet-red coloration and yields a brownish-orange vat.

In an analogous manner the p-dimethyl-aminoanil of 1:2-anthracenethioisatin is obtained from 1:2-anthracene-oxythiophene and p-nitrosodimethylaniline. The new product forms a brown-violet powder dissolving in sulfuric acid with olive-brown, in pyridine with violet red coloration. From 2:1-anthracene-oxythiophene and p-nitrosodimethylaniline the p-dimethylaminoanil of 2:1-anthracenethioisatin is obtained, forming a blackish-violet powder, dissolving in pyridine with bright violet-red, in concentrated sulfuric acid first with brown, then with olive-yellow coloration.

The 2:1-anthracenethioisatin itself may be obtained by action of oxalyl chloride on 2-mercaptoanthracene as follows:

210 parts of 2-mercaptoanthracene are introduced into 600 parts of oxalyl chloride at 0–10° and the reaction mass is then stirred for some time at ordinary temperature. The excess of oxalyl chloride is then distilled and the orange colored residue after addition of 1000 parts of carbon disulfide, is treated with 400 parts of aluminium chloride, which are added between 0° and 10° in the space of 2 hours and a half, while stirring thoroughly. The stirring is continued, raising the temperature slowly at the boiling temperature of the carbon disulfide and maintaining it for about one hour. The reaction product is then poured into water containing hydrochloric acid, the carbon disulfide is then distilled off with steam, the mixture filtered and the residue exhausted with a dilute solution of caustic soda. The 2:1-anthracenethioisatin thus obtained is precipitated with hydrochloric acid. It forms when crystallized from benzene brown-violet needles melting at 212°.

*Example 8.*

18.5 parts of 2-bromoanthraquinone-1-carboxylic acid are heated at boiling temperature in a reflux apparatus with a mixture of 8 parts of glycocol, 4 parts of magnesium bi-oxide, 0.2 parts of copper powder and 140 parts of water. After cooling the reaction mixture is treated with a mineral acid and filtered while hot, the residue is dissolved in a solution of caustic soda and the anthraquinone-2-glycine-1-carboxylic acid of the formula

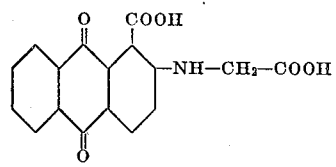

is precipitated from the solution by addition of acid, filtered and dried. It forms a light brown powder dissolving in concentrated sulfuric acid with difficulty yielding an orange solution. The acid is sparingly soluble also in alcohol and boiling toluene, more easily in boiling acetic acid.

If the anthraquinone-2-glycine-1-carboxylic acid is treated with acetic acid anhydride, according to the process of Example 6, the diacetylated derivative of the 2:1-anthraquinoneindoxyl is obtained in form of light-brown crystals. The formula of the 2:1-anthraquinoneindoxyl is:—

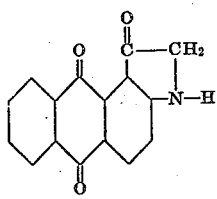

Example 9.

1 part of 2:1-anthracene-oxythiophene is dissolved in 9 parts of alcohol with addition of a caustic soda solution of 30% strength. Into the solution thus obtained there is directed a current of air. The 2:1:2':1'-bis-thiopheneanthracene-indigo thus formed is filtered, washed and dried.

In an analogous manner the symmetrical indigos of the following table which shows some of their properties, are obtained from oxythiophenes or indoxyls or their derivatives mentioned above.

| Indigo | Color of the powder | Color in concentrated H₂SO₄ | Color of the vat | Shade on cotton |
|---|---|---|---|---|
| 2:1:2':1'-bis-thiopheneanthracene indigo. | Brown. | Green-grey. | Orange-Brown. | Bordeaux. |
| 1:2:1':2'-bis-thiopheneanthracene indigo. | Brown-black. | Green-grey. | Brown. | Brown-yellow. |
| 2:1:2':1-bis-thiopheneanthraquinone indigo. | Dark-grey. | Olive-green. | Bluish-red. | Brown-grey. |
| 2:1:2':1'-pyrrolanthraquinone indigo. | Grey. | Olive. | Bluish-red. | Violet-brown. |

The formula of the 2:1:2':1'-bis-thiopheneanthraquinone indigo is:—

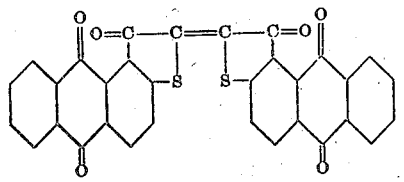

The formula of the 2:1':2':1'-pyrrolanthraquinone indigo is:—

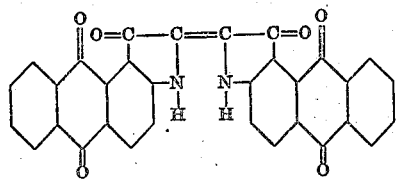

This latter compound is obtained by boiling with caustic alkaline solutions, in the presence of air, the anthraquinoneindoxyl compound disclosed at the end of Example 8.

The 2:1:2':1' - bis-thiopheneanthraquinone indigo may also be obtained by heating in a closed vessel the anthraquinone-2-thioglycol-1-carboxylic acid (cf. French Patent No. 576,103 of the applicants).

Example 10.

32 parts of anthracene-1-thioglycolic-2-carboxylic acid are boiled in a reflux apparatus with 25 parts of α isatin anilide, 10 parts of anhydrous sodium acetate and 150 parts of acetic acid anhydride. The dyestuff thus obtained is filtered, washed with glacial acetic acid, alcohol and dried. It forms a blackish-violet powder, dissolving in concentrated sulfuric acid with bluish-green coloration and yields a brown vat with heliotrope flower. It dyes cotton violet-grey tints. The same dyestuffs is obtained by condensing the 1:2-anthracene-oxythiophene with the isatin anilide in benzene or toluene solution.

Example 11.

11 parts of the dyestuff obtained by condensation of anthraquinone-2-thioglycolic-1-carboxylic acid and acenaphthenequinone, 18 parts of bromine and 350 parts of nitrobenzene are heated in a reflux apparatus for one hour. After cooling, the brominated dyestuff is filtered, washed with nitrobenzene and alcohol and dried. It forms a dark reddish-brown powder, soluble in concentrated sulfuric acid with olive coloration and yields a brown vat dyeing cotton orange-brown tints which are redder than those obtained with the non-halogenized dyestuff.

The following table shows the principal properties of a series of compounds which may be prepared according to the invention.

| First component | Second component | Color of the dry dyestuff | Color of the solution in H₂SO₄ | Color of the vat | Shades on cotton |
|---|---|---|---|---|---|
| I 1:2-anthracene-oxythiophene or anthracene-1-thioglycolic-2-carboxylic acid. | Isatin. | Dark brown. | Blue. | Orange-brown. | Light-brown. |
| II 1:2-anthracene-oxythiophene or anthracene-1-thioglycolic-2-carboxylic acid. | Isatin anilide. | Violet black. | Greenish-blue. | Brown. | Violet-brown. |
| III 1:2-anthracene-oxythiophene or anthracene-1-thioglycolic-2-carboxylic acid. | Acenaphthenequinone. | Dark grey. | Yellowish-green. | Violet-brown. | Light-brown. |
| IV 1:2-anthracene-oxythiophene or anthracene-1-thioglycolic-2-carboxylic acid. | p-dimethylaminoanil of 2:3-anthraquinone thioisatin. | Dark Bordeaux. | Bright green. | Yellowish-brown. | Violet-grey. |

| First component | Second component | Color of the dry dyestuff | Color of the solution in H₂SO₄ | Color of the vat | Shades on cotton |
|---|---|---|---|---|---|
| V 1:2-anthracene-oxythiophene or anthracene-1-thioglycolic-2-carboxylic acid. | p-dimethylaminoanil of 2:3-anthracene thioisatin. | Yellowish-green. | Insoluble. | Reddish-violet. | Yellowish-green. |
| VI 1:2-anthracene-oxythiophene or anthracene-1-thioglycolic-2-carboxylic acid. | p-dimethylaminoanil of 2:1-anthraquinone thioisatin. | Grey. | Olive-grey. | Red. | Brown. |
| VII 1:2-anthracene-oxythiophene or anthracene-1-thioglycolic-2-carboxylic acid. | p-dimethylaminoanil of 2:1-anthracene thioisatin. | Dark reddish-brown. | Greenish-blue. | Reddish-brown. | Reddish-brown. |
| VIII 1:2-anthracene-oxythiophene or anthracene-1-thioglycolic-2-carboxylic acid. | p-dimethylaminoanil of 1:2-naphthalene thioisatin. | Grey. | Grey-blue. | Yellowish-brown. | Brown. |
| IX 1:2-anthracene-oxythiophene or anthracene-1-thioglycolic-2-carboxylic acid. | p-dimethylaminoanil of 2:1-naphthalene thioisatin. | Dark-brown. | Blue. | Reddish-brown. | Brown. |
| X 1:2-anthracene-oxythiophene or anthracene-1-thioglycolic-2-carboxylic acid. | p-dimethylaminoanil of 2:3-naphthalene thioisatin. | Blackish. | Olive-green. | Red. | Bluish-grey. |
| XI 1:2-anthracene-oxythiophene or anthracene-1-thioglycolic-2-carboxylic acid. | Dibromoisatin chloride. | Violet. | Bluish-green. | Brown. | Violet-brown. |
| XII 1:2-anthracene-oxythiophene or anthracene-1-thioglycolic-2-carboxylic acid. | Dibromoisatin. | Dark-grey-brown. | Violet-blue. | Orange-brown. | Yellowish-olive |
| XIII 1:2-anthracene-oxythiophene or anthracene-1-thioglycolic-2-carboxylic acid. | 7-methoxyisatin chloride. | Violet. | Bluish-green. | Brown. | Violet. |
| XIV 2:1-anthracene-oxythiophene or anthracene-2-thioglycolic-1-carboxylic acid. | p-dimethylaminoanil of 2:3-anthraquinonethioisatin. | Violet-brown. | Bright-green. | Yellowish-brown. | Bluish-Bordeaux. |
| XV 2:1-anthracene-oxythiophene or anthracene-2-thioglycolic-1-carboxylic acid. | p-dimethylaminoanil of 2:3 anthracenethioisatin. | Dark-grey. | Olive. | Blackish-Bordeaux. | Grey. |
| XVI 2:1-anthracene-oxythiophene or anthracene-2-thioglycolic-1-carboxylic acid. | p-dimethylaminoanil of 2:1-anthraquinonethioisatin. | Brown. | Grey-green. | Reddish-brown. | Bordeaux. |
| XVII 2:1-anthracene-oxythiophene or anthracene-2-thioglycolic-1-carboxylic acid. | p-dimethylaminoanil of 1:2-anthracenethioisatin. | Dark reddish-brown. | Greenish-blue. | Reddish-brown. | Reddish-brown. |
| XVIII 2:1-anthracene-oxythiophene or anthracene-2-thioglycolic-1-carboxylic acid. | p-dimethylaminoanil of 1:2-naphthalenethioisatin. | Dark reddish-brown. | Reddish-brown. | Reddish-brown. | Reddish-brown. |
| XIX 2:1-anthracene-oxythiophene or anthracene-2-thioglycolic-1-carboxylic acid. | p-dimethylaminoanil of 2:1-naphthalenethioisatin. | Brown. | Green-blue. | Reddish-brown. | Reddish-brown. |
| XX 2:1-anthracene-oxythiophene or anthracene-2-thioglycolic-1-carboxylic acid. | p-dimethylaminoanil of 2:3-naphthalenethioisatin. | Blackish. | Green. | Red. | Greyish-Bordeaux. |
| XXI 2:1-anthracene-oxythiophene or anthracene-2-thioglycolic-1-carboxylic acid. | 2:1-naphthisatin chloride. | Grey-brown. | Blue. | Brown. | Violet-brown. |
| XXII 2:1-anthracene-oxythiophene or anthracene-2-thioglycolic-1-carboxylic acid. | Acenaphthenequinone. | Brown. | Green. | Yellowish-brown. | Orange-brown. |
| XXIII 2:1-anthracene-oxythiophene or anthracene-2-thioglycolic-1-carboxylic acid. | Thionaphthenequinone. | Dark brown. | Greenish-blue. | Brown. | Bordeaux. |
| XXIV 2:1-anthraquinone-oxythiophene or anthraquinone-2-thioglycolic-1-carboxylic acid. | p-dimethylaminoanil of 2:3-anthraquinonethioisatin. | Blackish. | Olive-green. | Violet-brown. | Violet-grey. |
| XXV 2:1-anthraquinone-oxythiophene or anthraquinone-2-thioglycolic-1-carboxylic acid. | p-dimethylaminoanil of 2:3-anthracenethioisatin. | Blackish. | Olive. | Grey. | Greyish-green. |
| XXVI 2:1-anthraquinone-oxythiophene or anthraquinone-2-thioglycolic-1-carboxylic acid. | p-dimethylaminoanil of 1:2-anthracenethioisatin. | Grey. | Olive-grey. | Red. | Greyish-brown. |
| XXVII 2:1-anthraquinone-oxythiophene or anthraquinone-2-thioglycolic-1-carboxylic acid. | p-dimethylaminoanil of 2:1-anthracenethioisatin. | Brown. | Greyish-green. | Reddish-brown. | Brown. |
| XXVIII 2:1-anthraquinone-oxythiophene or anthraquinone-2-thioglycolic-1-carboxylic acid. | p-dimethylaminoanil of 1:2-naphthalenethioisatin. | Dark gray. | Brownish-violet. | Orange-brown. | Dark brown. |
| XXIX 2:1-anthraquinone-oxythiophene or anthraquinone-2-thioglycolic-1-carboxylic acid. | p-dimethylaminoanil of 2:1-naphthalenethioisatin. | Brown. | Blackish-green. | Red. | Brownish-red. |
| XXX 2:1-anthraquinone-oxythiophene or anthraquinone-2-thioglycolic-1-carboxylic acid. | p-dimethylaminoanil of 2:3-naphthalenethioisatin. | Green. | Olive. | Reddish-brown. | Greyish-blue. |
| XXXI 2:1-anthraquinone-oxythiophene or anthraquinone-2-thioglycolic-1-carboxylic acid. | Isatin anilide. | Dark-Bordeaux. | Olive-green. | Scarlet. | Heliotrope. |
| XXXII 2:1-anthraquinone-oxythiophene or anthraquinone-2-thioglycolic-1-carboxylic acid. | 7-methylisatin tolulidide. | Blackish-brown. | Blackish-green. | Red. | Bluish-grey. |
| XXXIII 2:1-anthraquinone-oxythiophene or anthraquinone-2-thioglycolic-1-carboxylic acid. | Isatin. | Red-brown. | Olive. | Brownish-yellow. | Brown. |
| XXXIV 2:1-anthraquinone-oxythiophene or anthraquinone-2-thioglycolic-1-carboxylic acid. | Acenaphthenequinone. | Light red-brown. | Green. | Brown-yellow. | Orange-brown. |
| XXXV p-dimethylaminoanil of 2:1-anthracenethioisatin. | 2:3-anthraquinone-indoxyl. | Dark violet. | Pure green. | Greyish-brown. | Violet-grey. |
| XXXVI p-dimethylaminoanil of 1:2-anthracenethioisatin. | 2:3-anthraquinone-indoxyl. | Dark grey. | Yellowish-green. | Brownish-olive. | Grey. |
| XXXVII p-dimethylaminoanil of 2:1-anthraquinonethioisatin. | 2:3-anthraquinone-indoxyl. | Blackish. | Greyish-olive. | Brown. | Greenish-grey. |
| XXXVIII p-dimethylaminoanil of 2:1-anthracenethioisatin. | Oxythionaphthene. | Dark brown. | Greenish-blue. | Brown. | Bordeaux. |

Some of the dyestuffs of the above table numbered as indicated below correspond with the following formulæ:

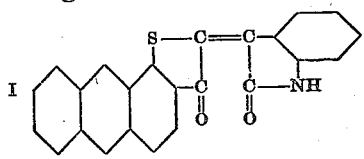

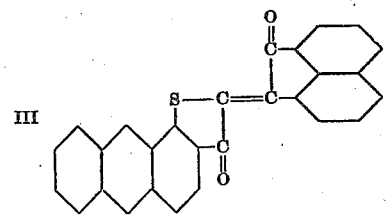

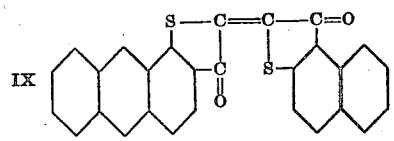

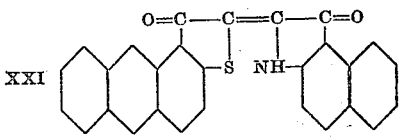

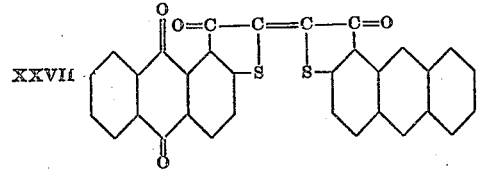

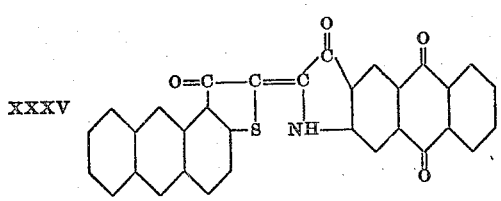

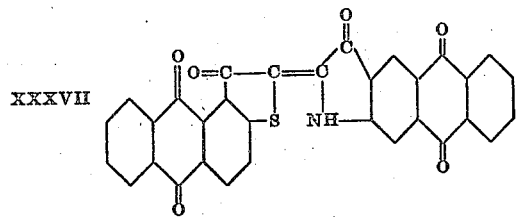

What we claim is:

1. As a step in the production of dyestuffs corresponding with the general formula

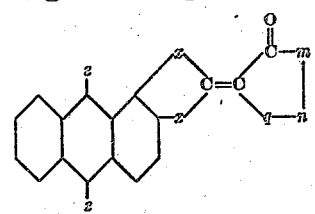

wherein one of the two $x$'s stands for a sulfur atom and the other for a CO group, $z$ for a hydrogen or an oxygen atom and $m$, $n$ and $q$ for three members of a 5 membered nucleus of which two at least are carbon atoms adjacent to each other and belonging to an aromatic system, the third being S, NH or C, the production of mercaptocarboxylic acids corresponding with the general formula

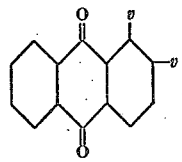

wherein one of the two $v$'s stands for a SH group and the other for a COOH group, by condensing the products corresponding with the general formula

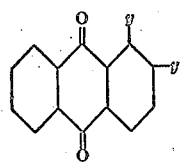

wherein one of the two $y$'s stands for a carboxylic group and the other for a halogen atom, with alkali metal sulfhydrates.

2. As a step in the production of dyestuffs corresponding with the general formula

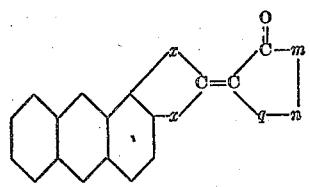

wherein one of the two $x$'s stands for a sulfur atom and the other for a CO group and $m$, $n$ and $q$ for three members of a 5 membered nucleus of which two at least are carbon atoms adjacent to each other and belonging to an aromatic system, the third being S, NH or C, the production of the compounds corresponding with the general formula

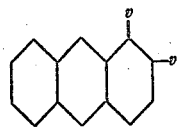

wherein one of the two $v$'s stands for a carboxylic group and the other for a SH group, by treatment of the compounds corresponding with the general formula

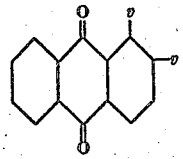

wherein one of the $v$'s stands for a COOH group and the other for a SH group, with reducing agents.

3. As a step in the production of dyestuffs corresponding with the general formula

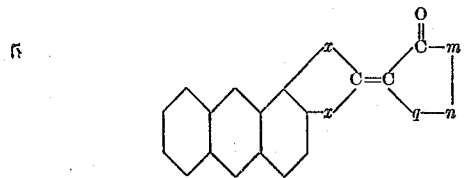

wherein one of the two $x$'s stands for a sulfur atom and the other for a CO group and $m$, $n$ and $q$ for three members of a 5 membered nucleus of which two at least are carbon atoms adjacent to each other and belonging to an aromatic system, the third being S, NH or C, the production of products corresponding with the general formula

wherein one of the two $u$'s stands for the —S—CH$_2$—COOH group and the other for the COOH group, by condensing the products corresponding with the general formula

wherein one of the two $v$'s stands for a SH group and the other for the COOH group, with monohalogenoacetic acids.

4. As a step in the production of dyestuffs corresponding with the general formula

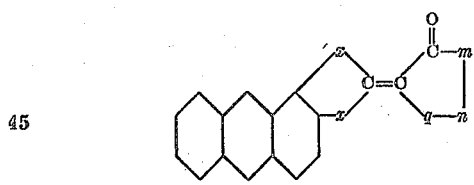

wherein one of the two $x$'s stands for a sulfur atom and the other for a CO group and $m$, $n$ and $q$ for three members of a 5 membered nucleus of which two at least are carbon atoms adjacent to each other and belonging to an aromatic system, the third being S, NH or C, the production of oxythiophene compounds corresponding with the general formula

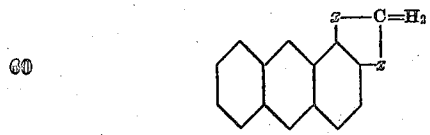

wherein one of the two $x$'s stands for a CO group and the other for a sulfur atom, by treating the products corresponding with the general formula

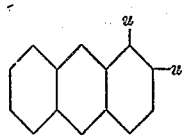

wherein one of the two $u$'s stands for a —S—CH$_2$—COOH group and the other for a COOH group, with condensing agents having an acid action.

5. As a step in the production of dyestuffs corresponding with the general formula

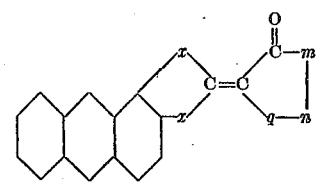

wherein one of the two $x$'s stands for a sulfur atom and the other for a CO group and $m$, $n$ and $q$ for three members of a 5 membered nucleus of which two at least are carbon atoms adjacent to each other and belonging to an aromatic system, the third being S, NH or C, the condensation of oxythiophene compounds corresponding with the general formula

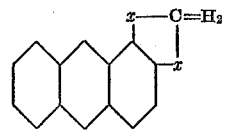

wherein one of the two $x$'s stands for a CO group and the other for a sulfur atom, with aromatic polycyclic products having the characteristic grouping

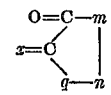

wherein $x$ stands for O, halogen or an anil radical, and $m$, $n$ and $q$ have the signification indicated above.

6. As a step in the production of dyestuffs corresponding with the general formula

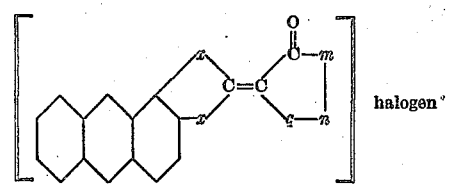

wherein one of the two $x$'s stands for a sulfur atom and the other for a CO group and $m$, $n$ and $q$ for three members of a 5 membered nucleus of which two at least are carbon atoms adjacent to each other and belonging to an aromatic system, the third being S, NH or C, the treatment of the dyestuffs corresponding with the general formula:

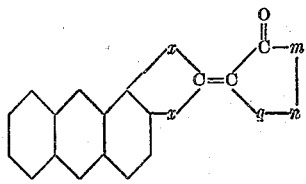

wherein one of the two $x$'s stands for a sulfur atom and the other for a CO-group and $m$, $n$, and $q$ for three members of a 5 membered nucleus of which two at least are carbon atoms adjacent to each other and belonging to an aromatic system, the third being S, NH or C with halogenizing agents.

7. A process for the production of dyestuffs corresponding with the general formula:

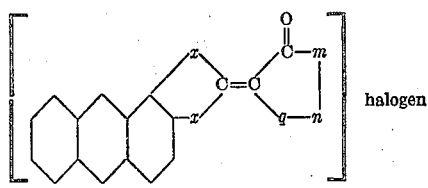

wherein one of the two $x$'s stands for a sulfur atom and the other for a CO-group and $m$, $n$ and $q$ for three members of a 5 membered nucleus of which two at least are carbon atoms adjacent to each other and belonging to an aromatic system, the third being S, NH or C, which consists in treating compounds of the general formula

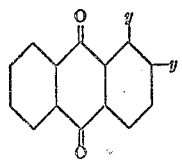

wherein one of the two $y$'s stands for a carboxylic group and the other for a halogen atom, with an alkali metal sulfhydrate to produce an anthraquinone mercapto-carboxylic acid corresponding with the general formula

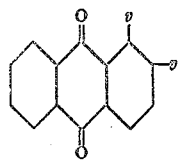

wherein one of the two $v$'s stands for a SH-group and the other for a COOH-group, treating the resulting compound with a reducing agent to produce an anthracene-mercapto-carboxylic acid of the general formula:—

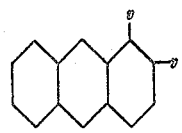

wherein one of the two $v$'s stands for a COOH-group and the other for a SH-group, treating the resulting compound with monohalogen acetic acid to produce an anthracene thioglycolic carboxylic acid of the general formula:—

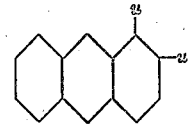

wherein one of the $u$'s stands for the COOH-group and the other for the S—CH$_2$—COOH-group, treating the resulting compound with condensing agents having an acid action to produce an anthracene oxythiophene compound of the general formula:—

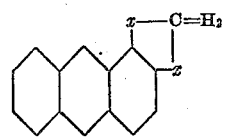

wherein one of the two $x$'s stands for a CO-group and the other for a sulfur atom, treating the resulting products with compounds having the characteristic grouping

wherein $x$ stands for O, halogen, or an anil radical, and $m$, $n$ and $q$ have the signification indicated above and finally halogenizing the dyestuffs thus obtained.

8. As new products the indigoid dyestuffs corresponding with the general formula

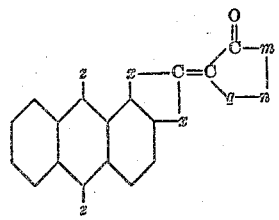

wherein one of the two $x$'s stands for a sulfur atom and the other for a CO group, $z$ for a hydrogen or an oxygen atom and $m$, $n$ and $q$ for three members of a 5 membered nucleus of which two at least are carbon atoms adjacent to each other and belonging to an aromatic system, the third being S, NH or C, which products form yellowish-green to grey, brown, violet and black powders, dissolving in concentrated sulfuric acid with yellowish-green to green, blue and violet coloration which are more or less bright or blackish, in dilute caustic soda solution on addition of hydrosulfite with yellow-brown to olive and bluish-red coloration, dyeing cotton green to brown, Bordeaux, violet and grey fast tints.

9. As new products the indigoid dyestuffs corresponding with the general formula

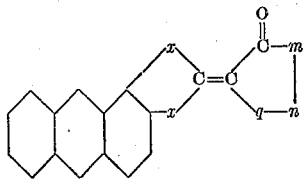

wherein one of the two $x$'s stands for a sulfur atom and the other for a CO group and $m$, $n$ and $q$ for three members of a 5 membered nucleus of which two at least are carbon atoms adjacent to each other and belonging to an aromatic system, the third being S, NH or C, which products form yellowish-green to grey, brown, violet and black powders, dissolving in concentrated sulfuric acid with yellowish-green to green, blue and violet coloration which are more or less bright or blackish, in dilute caustic soda solution on addition of hydrosulfite with yellow-brown to olive and bluish-red coloration, dyeing cotton green to brown, Bordeaux, violet and grey fast tints.

10. Material dyed with the dyestuffs of claim 8.

11. Material dyed with the dyestuffs of claim 9.

In witness whereof we have hereunto signed our names this 18th day of February, 1926.

BERTRAM MAYER.
JAKOB WÜRGLER.